(12) United States Patent
Sun

(10) Patent No.: US 8,816,540 B2
(45) Date of Patent: Aug. 26, 2014

(54) HIGH ENERGY DENSITY VIBRATION ENERGY HARVESTING DEVICE WITH HIGH-MU MATERIAL

(75) Inventor: Nian-Xiang Sun, Winchester, MA (US)

(73) Assignee: Northeastern University, Boston, MA (US)

( * ) Notice: Subject to any disclaimer, the term of this patent is extended or adjusted under 35 U.S.C. 154(b) by 171 days.

(21) Appl. No.: 13/554,263

(22) Filed: Jul. 20, 2012

(65) Prior Publication Data

US 2013/0106206 A1 May 2, 2013

Related U.S. Application Data

(60) Provisional application No. 61/510,781, filed on Jul. 22, 2011.

(51) Int. Cl.
*H02K 35/00* (2006.01)
*H02K 35/02* (2006.01)

(52) U.S. Cl.
CPC ............ *H02K 35/02* (2013.01); *H02K 2213/03* (2013.01)
USPC .............................................. 310/25; 310/15

(58) Field of Classification Search
CPC ...................................................... H02K 35/02
USPC ....................................... 310/15, 17, 25, 12.12
See application file for complete search history.

(56) References Cited

U.S. PATENT DOCUMENTS

| | | | | |
|---|---|---|---|---|
| 5,896,076 | A * | 4/1999 | van Namen | 335/229 |
| 2008/0284258 | A1 * | 11/2008 | Spratte et al. | 310/25 |
| 2009/0134721 | A1 * | 5/2009 | Zimmerling | 310/15 |
| 2011/0074162 | A1 * | 3/2011 | Cottone et al. | 290/1 R |
| 2011/0140577 | A1 * | 6/2011 | Galchev et al. | 310/339 |
| 2011/0193428 | A1 * | 8/2011 | Lemieux | 310/25 |

* cited by examiner

*Primary Examiner* — Thanh Lam
(74) *Attorney, Agent, or Firm* — Wilmer Cutler Pickering Hale and Dorr LLP

(57) ABSTRACT

The present disclosure describes a vibration energy harvester with increased output power density. The vibration energy harvester has two magnetic solenoids, each with cores that include multiple layers of high permeability materials. The two magnetic solenoids are fixed at two sides of a movably supported hard magnetic core, such as a magnet pair with anti-parallel magnetization, which produces a spatially inhomogeneous bias magnetic field for switching the flux inside the solenoids during vibration of the magnetic core. An output voltage of 2.52 V and a power density 20.84 mW/cm3 at 42 Hz, with a half peak working bandwidth of 6 Hz.

16 Claims, 8 Drawing Sheets

FIG. 1

| Mechanisms /Products | $f_{center}$ (Hz) | a (g) | $P_{max}$ (mW) | Power Density (mW/cm³) |
|---|---|---|---|---|
| Electrostatic | 50 | 0.91 | 1.052 | 0.58 |
| Magnetoelectric | 40 | 1 | - | 0.4 |
| Piezoelectric | 30 | 1.1 | 6.5 | 6.63 |
| ME sensor based | 60 | 0.1 | 10.8 | 0.096 |
| Magnetostrictive | 58.1 | 1 | 0.2 | - |
| Perpetuum | 21.9 | 1 | 92 | 0.7 |
| KCF | 360 | 0.239 | 4.1 | 0.0196 |
| High-μ (1st gen) | 54 | 0.57 | 74 | 1.07 |
| High-μ (2nd gen) | 27 | - | 133.88 | 4.57 |
| | 33 | - | 258.62 | 8.83 |
| | 42 | - | 610.62 | 20.84 |

HIGH ENERGY DENSITY VIBRATION ENERGY HARVESTING DEVICE WITH HIGH-MU MATERIAL

CROSS REFERENCES TO RELATED APPLICATIONS

This application claims the benefit of and priority under 35 U.S.C. §119(e) to U.S. Provisional Application No. 61/510,781, filed on Jul. 22, 2011, and entitled "High Energy Density Vibration Energy Harvesting Device with High-mu Material," the disclosure of which is hereby incorporated herein by reference in its entirety.

FIELD OF THE INVENTION

The present disclosure relates generally to high energy density vibration energy harvesting devices with high-mu materials.

BACKGROUND

Vibration energy harvesting technologies are developing rapidly, showing great potential in many different applications. For example, miniature vibration energy harvesters are often used for applications such as autonomous sensors and system on chip applications. Most applications use one of four major vibration energy harvesting mechanisms, including electromagnetic, electrostatic, magnetoelastic, and piezoelectric mechanisms. However, such vibration energy harvesters achieve different output powers and energy densities. For example, piezoelectric-based vibration energy harvesters often demonstrate a much higher energy density than other counterpart mechanisms, reaching ~6 mW/cm$^3$. Specifically, some piezoelectric bare beam based vibration energy harvesters can generate a power of 6.63 mW/cm$^3$. Because of this, piezoelectric-based vibration energy harvesters are often more widely used than other forms of vibration energy harvesters. However, they can suffer from narrow bandwidth (or a limited operating frequency range of 2-5% of the center operating frequency), degraded polarization after prolonged use, and/or the negative side-effects caused by a brittle cantilever.

SUMMARY

In one aspect, an energy harvesting device, includes a first and second solenoid, each solenoid including (a) a wire coil wrapped around (b) a high permeability core with two or more layers, and the first and second solenoid being disposed along a first path, and a magnetic core: disposed between the first and second solenoid such that the first solenoid is mounted on a first side of the magnetic core, and the second solenoid is mounted on a second side of the magnetic core, and mounted on a support such that the magnetic core can vibrate along a second path that intersects the first path, vibration of the magnetic core inducing a flux change in the first and second solenoids.

In one aspect, in an energy harvesting device, including (1) a first and second solenoid, each solenoid including (a) a wire coil wrapped around (b) a high permeability core with two or more layers, and the first and second solenoid being disposed along a first path, and (2) a magnetic core disposed between the first and second solenoid such that the first solenoid is mounted on a first side of the first magnet, and the second solenoid is mounted on a second side of the first magnet, the magnetic core being mounted on a support such that the magnetic core can vibrate along a second path that is orthogonal to the first path, a method includes vibrating the magnetic core along the second path to induce a flux change in the first and second solenoids.

In one or more embodiments, the magnetic core includes a first magnet.

In one or more embodiments, the magnetic core includes a second magnet disposed above the first magnet such that the first magnet and second magnet have anti-parallel moments.

In one or more embodiments, the support includes a spring.

In one or more embodiments, the spring includes a circular cross-section.

In one or more embodiments, the spring has a resonance frequency of 42 Hz.

In one or more embodiments, vibration of the magnetic core achieves a power output density of 20.84 mW/cm$^3$.

In one or more embodiments, each high permeability core is a 28-layer core, each layer including dimensions 2 cm×2 cm×0.002 inch.

In one or more embodiments, the magnetic core includes a second magnet, and the first and second magnets are SmCo magnets with dimensions 2.2 cm×1.3 cm×0.2 cm.

In one or more embodiments, a total volume of the energy harvesting device is 6.44 cm×3.25 cm×1.4 cm=29.3 cm$^3$.

In one or more embodiments, the first solenoid, the second solenoid, and the support are mounted to a base such that the first path is substantially parallel to the base, and the second path is substantially perpendicular to the base.

In one or more embodiments, the first and second solenoids include a same size.

In one or more embodiments, the first and second solenoids include a same shape.

In one or more embodiments, the first and second solenoids are joined in series to double a voltage of the energy harvesting device.

In one or more embodiments, the magnetic core is vibrated at 42 Hz, and an output power of 610.62 mW is generated.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 1 is a table that lists different comparison metrics for various vibrating energy harvesting mechanisms in accordance with certain embodiments;

DETAILED DESCRIPTION OF THE INVENTION

Figure 2A:
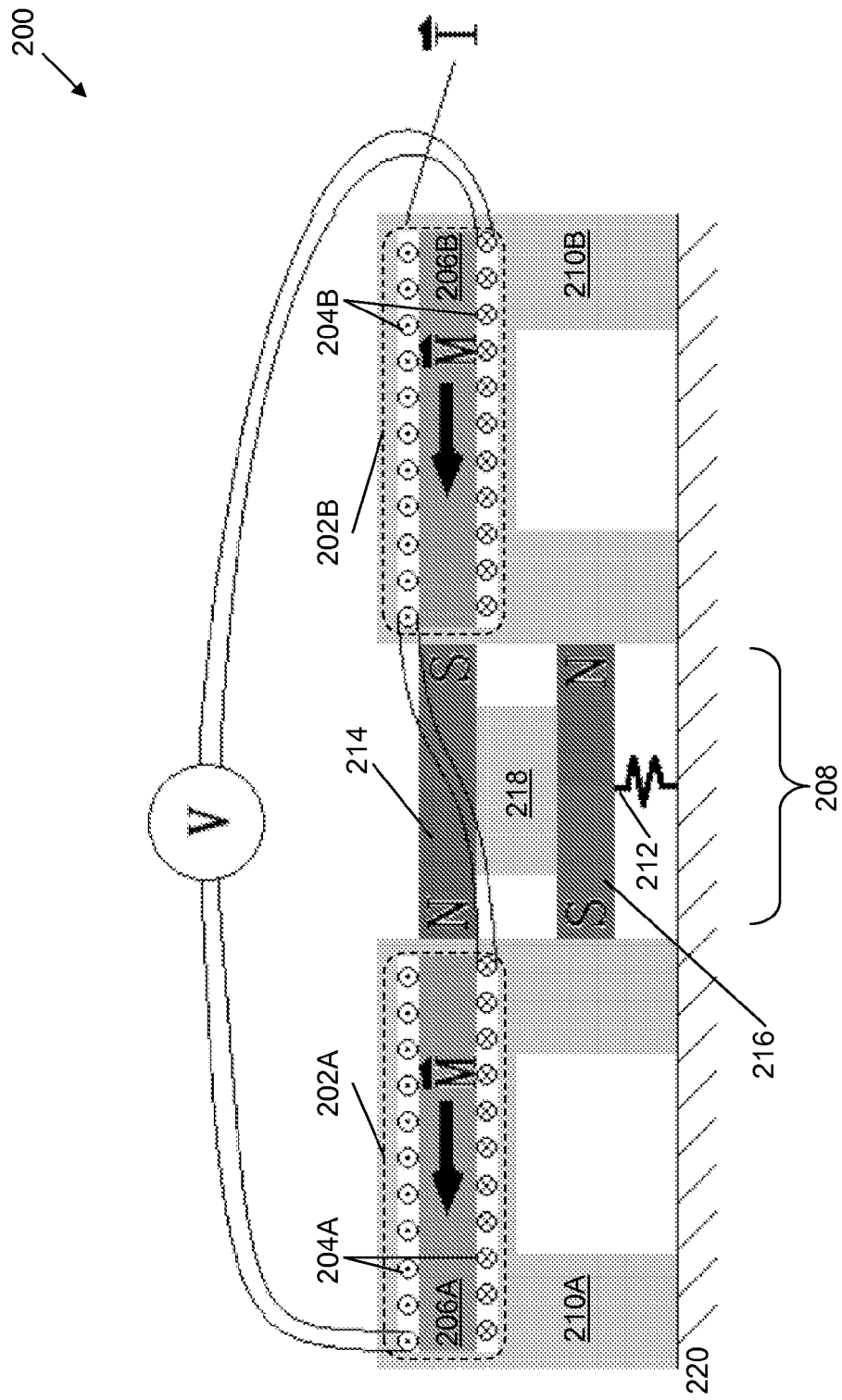
FIG. 2A is a schematic of an energy harvesting device in accordance with certain embodiments.

The present disclosure provides for magnetic-based vibration energy harvesters that achieve a high energy density by using high permeability magnetic materials. While a piezoelectric bare beam based vibration energy harvester can generate a power energy density of 6.63 mW/cm$^3$, theoretically the magnetostatic energy density (½ μH$^2$) in high permeability magnetic materials is 10$^5$-10$^6$ times that of the electrostatic energy density (½ ∈E$^2$) in piezoelectrics. Such magnetic-based vibration energy harvesters can achieve, for example, a energy density greater than 20 mW/cm$^3$ (e.g., with an acceleration of 5 g), which is over 3 times the energy density of known vibration energy harvesters.

Before describing in detail the particular components of magnetic-based vibration energy harvesters, in some embodiments the vibration energy harvesters include two fixed solenoids. Each solenoid has a multi-layer high permeability solenoid core. A vibrating magnetic core is disposed between the two fixed solenoids. The multilayer high permeability solenoid cores lead to significantly increased flux change in the solenoid within one period of vibration of the magnetic core than other such devices, without increasing the total volume of the device. In addition, the two solenoids at both sides of the vibrating magnet(s) make full use of the spatially inhomogeneous bias magnetic fields at both sides of the magnets, leading to doubled power output, and a dramatically enhanced power density than previous energy harvesters.

FIG. 1 is a table 100 that shows metrics of comparison among various vibrating energy harvesting mechanisms. The mechanisms/products include electrostatic, magnetoelectric, piezoelectric, magnetoelectric sensor based, magnetostrictive, perpetuum, KCF (from KCF Technologies of State College, Pa.), and high permeability (High-μ (1$^{st}$ gen), and High-μ (2$^{nd}$ gen)) material-based energy harvesting devices. The metrics of comparison include the central frequency $f_{center}$, measured in Hz; acceleration "a," measured in g (9.8 m/s$^2$); $P_{max}$, the maximum output power of the device, measured in mW; and power density, measured in mW/cm$^3$. As shown in table 100, the 2$^{nd}$ generation high-μ vibration energy harvester (e.g., which includes two fixed solenoids with multi-layer high permeability cores, and a vibrating magnetic core, as described herein) has the largest output power density of 20.84 for an $f_{center}$ of 42 Hz. Such a power density is over three times larger than the widely used piezoelectric device. Further, the performance of the High-μ (2$^{nd}$ gen) device is greater than that of the High-μ (1$^{st}$ gen) device (e.g., upwards of 10× the flux change of the High-μ (1$^{st}$ gen) device). The High-μ (2$^{nd}$ gen) device uses two stationary solenoids with thicker multi-layer high-μ magnetic core materials (e.g., 20 layers of material), which allows a greater flux change to be induced in one vibration of the magnetic core. In contrast, the High-μ (1$^{st}$ gen) device has a single vibrating solenoid, and therefore the solenoid core can not be thick, resulting in less flux change.

FIG. 2A is a schematic of an energy harvesting device 200 in accordance with certain embodiments. The energy harvesting device 200 includes a first solenoid 202A and a second solenoid 202B (indicated by respective dotted rectangles for ease of reference, and collectively referred to herein as solenoids 202). Each solenoid 202 can include a wire coil (204A, 204B) wrapped around a multi-layer high permeability (high-μ) core (206A, 206B). The energy harvesting device 200 includes a magnetic core 208, which is disposed between solenoid 202A and solenoid 202B. Solenoid 202A is mounted to the base 220 on the left side of the magnetic core 208 via mount 210A, and solenoid 202B is mounted to the base 220 on the right side of the magnetic core 208 via mount 210B. The magnetic core 208 is mounted to the base 220 via support 212 such that the magnetic core 208 can vibrate between the solenoids 202. While two solenoids 202 are shown in device 200, any number of solenoids can be used for a particular energy harvesting device (e.g., 1, 3, etc.). Further, the configuration shown in FIG. 2A is intended to be exemplary only, and is not intended to be limiting. One of skill can appreciate that other variations of energy harvesting devices can be engineered according to the principles described herein without departing from the spirit of the description.

In some embodiments, the solenoids 202 are manufactured to have the same size (e.g., the same three dimensional size) and/or shape (e.g., the same number of layers in the cores 206A, 206B, and the same number of coil layers for each coil 204A, 204B, the same number of rotations around the core per coil layer, and/or the like). In some embodiments, the multi-layer high permeability cores (206A, 206B) are formed of multiple layers of a non-oriented 80% nickel-iron-molybdenum alloy, which offers extremely high permeability. The material can be fabricated using hydrogen annealing to maximize permeability. In some embodiments, the high permeability materials are foils provided by The MuShield® Company of Londonderry, N.H. (e.g., foil with thicknesses of 0.002", 0.004", 0.006", and/or 0.010"). Any high permeability magnetic materials can be used as the magnetic core for the energy harvester to achieve similar harvester performance. (e.g., ferrite or other inductor core materials).

The magnetic core 208 includes magnets 214 and 216. Magnet 214 is disposed above the magnet 216 such that the magnets have anti-parallel moments (e.g., the North (N) pole of magnet 214 is disposed above the South (S) pole of magnet 216, and the South (S) pole of magnet 214 is disposed above the North (N) pole of magnet 216). The magnets 214, 216 are joined by joining portion 218 (e.g., which can be made from a magnetic or a non-magnetic material). In some embodiments, the support 212 is a spring (e.g., with a circular cross-section, a square cross-section, and/or the like). While the magnetic core 208 is shown with two magnets 214 and 216, the magnetic core can include any number of magnets. For example, in some embodiments, the magnetic core 208 includes one magnet, or three or more magnets. Further, the magnets can be arranged in other ways than with anti-parallel moments. For example, the magnets can be oriented such that the same moments are aligned (e.g., N above N, and S above S). As another example, the magnets can be partially crossed, such that they do not completely overlap with each other (e.g., to form an "X" shape).

Vibration of magnetic core 208 creates a voltage V across the solenoids 202. As the pair of magnets 214, 216 vibrate up and down, the magnetic field lines inside each solenoid 202 change direction periodically, inducing a large magnetic flux change (M) in both solenoids 202. The magnetostatic coupling between the solenoids 202 and the time varying inhomogeneous bias magnetic field results in a nonlinear oscillation and a complete magnetic flux reversal in the solenoids 202. The presence of the multi-layer highly permeable cores dramatically increase the magnitude of magnetic flux inside the coils of the solenoids 202. The induced voltage can be doubled to form voltage V by connecting the two solenoids in series.

Figure 2B:
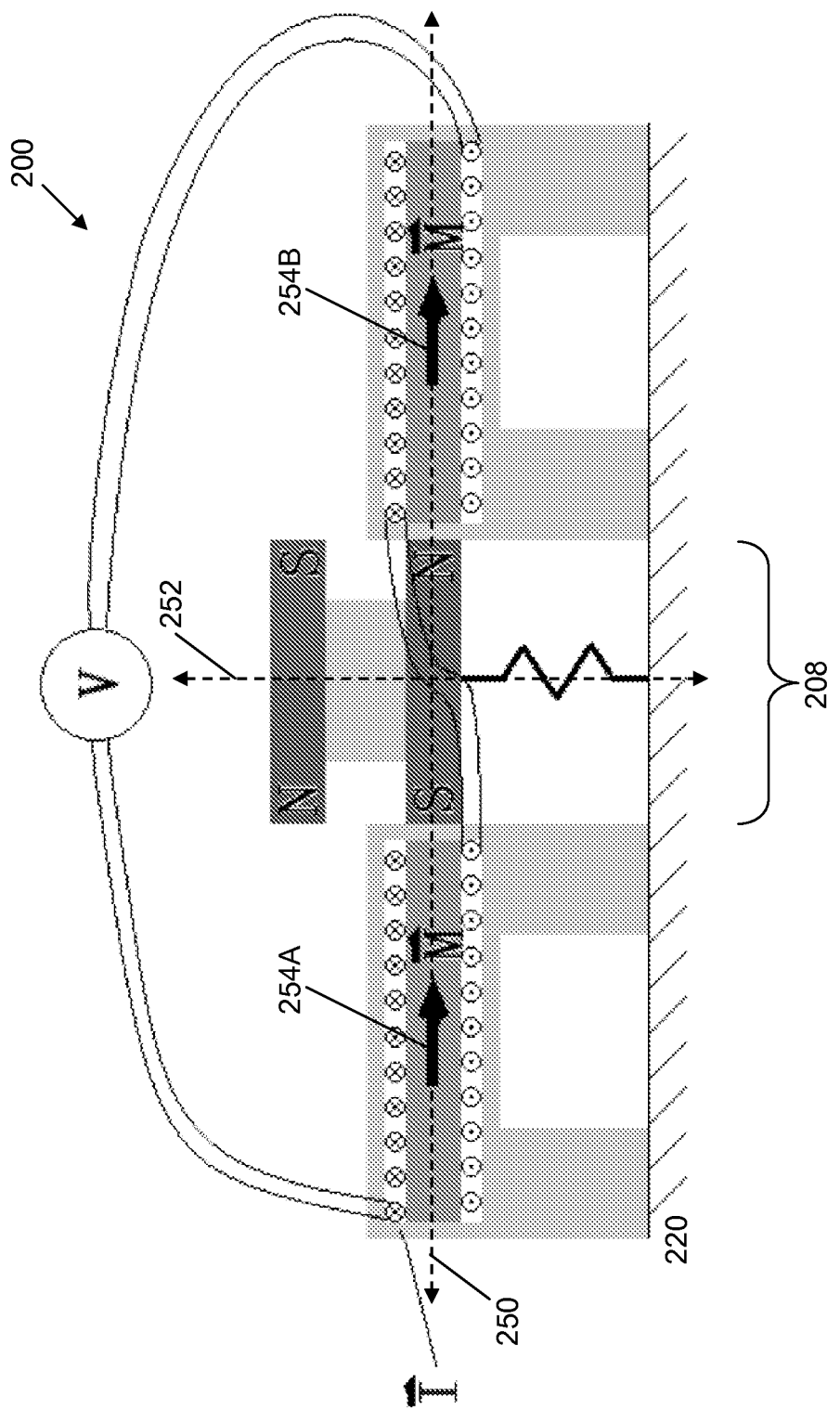
FIG. 2B is a schematic of the energy harvesting device of FIG. 2A with its magnetic core in an upper position in accordance with certain embodiments.

FIG. 2B is a schematic of the energy harvesting device 200 of FIG. 2A with the magnetic core 208 in an upper position. As shown in FIGS. 2A-2B, the solenoids 202 are disposed along first path 250. In some embodiments, the first path 250 is substantially horizontal to the surface plane of the base 220. Magnetic core 208 can vibrate along a second path 252 that intersects (e.g., is orthogonal to) the first path 250. In some embodiments, the second path 252 is substantially perpendicular to the surface plane of base 220. As shown by arrows 254A, 254B, vibration of the magnetic core along path 252 induces a flux change in the solenoids 202 (e.g., arrows 254A, 254B point to the right in FIG. 2B, compared to the arrows in FIG. 2A which point left, due to the movement of the magnetic core 208 to an upward position along the path 252. The mass of the hard magnetic core 208, the stiffness of the supporting spring, and/or the magnetostatic coupling between the solenoids 202 and/or hard magnetic core 208 can determine the resonance vibration frequency and the output voltage of the energy harvester.

While paths 250, 252 are shown as straight paths in FIG. 2B, in some embodiments the paths are nonlinear paths. For example, an equivalent stand-alone spring-mass system becomes a nonlinear oscillation system once introduced into the energy harvesting device 200 due to the magnetostatic coupling between the solenoids 202 and the hard magnetic core 208. This nonlinear effect can be explained, for example, from a potential energy point of view. The elastic potential energy of a stand-alone spring-mass system is a well-know linear relationship, with only one minimum value, which happens when the mass passes the equilibrium position in the middle. In contrast, the magnetostatic potential energy has two identical minimum values due to the coupling between the magnet(s) and solenoids, which appear when the magnet(s) move a short distance up or down from the equilibrium position in the middle. As a result, the superposition of two different types of potential energy make a nonlinear relationship, leading to a wider oscillation frequency range.

In some embodiments, the total induced voltage of the energy harvesting device equals the integral over the whole solenoid, because the magnetic field magnitude varies along the axis. The open circuit voltage, V, can be expressed by Equation (1):

$$V = 2\frac{d\varphi(t)}{dt} \qquad (1)$$
$$= 2\frac{d\int \{H[x, y(t)] + 4\pi M[x, y(x, t)]\} \cdot A \cdot dN}{dt}$$
$$= 2\frac{d\int 4\pi M[x, y(x, t)] \cdot A \cdot dN}{dt},$$

where:
$d\varphi(t)$=the magnetic flux change over time;
dt=time;
H[x,y(t)]=the magnetic field H at time t, at the spatial position defined by the point (x (along the length of the solenoid), y (along the direction the vibrating magnetic core travels));
M[x,y(x,t)]=magnetization M as a function of time t at coordinates x, y(x,t);
A=the total cross section area of the multilayer cores of the solenoids; and
dN=the number of loops in the infinitesimal length unit of the solenoid, which can be calculated according to Equation (2):

$$dN = N_L \cdot dx/d_w. \qquad (2)$$

where:
$N_L$=the number of loop layers of the coil;
dx=the position x along the length of the solenoid; and
$d_w$=the copper wire diameter.

Hence, the maximum output power $P_{max}$, which happens when the load impedance equals the conjugate of the output impedance of the solenoid coil $R_{coil}$, is defined by Equation (3):

$$P_{max} = \frac{(V/2)^2}{R_{coil}} = \frac{16S}{R_{coil}}\left(A'\pi\frac{N_L}{d_w}\right)^2\left(\int_0^L\left\{\frac{dM[x, y(x, t)]}{dt}\right\}dx\right)^2, \qquad (3)$$

where:
$R_{coil}$=the resistance of the solenoid;
S=the number of layers in each core;
A'=the cross section area of one layer of the core;
L=the length of the solenoid; and
$d_w$=the diameter d of the wire w.

Equation (3) shows that the output power $P_{max}$ increases as the vibration frequency increases (e.g., if all other parameters are kept constant). In some examples, when using the same source power, the amplitude decreases if the frequency increases. Moreover, at a particular frequency, the output power $P_{max}$ can depend on the total magnetic flux change in the solenoid, in one oscillation period, which is directly related to the permeability μ of the magnetic cores. Therefore, multi-layer soft magnetic beams with a high permeability constitute excellent candidates for the solenoid cores. In some embodiments, a multilayer structure of magnetic material generates a much larger flux change than a single layer, as shown in FIG. 1 by the High-μ ($1^{st}$ gen) device, which among other differences, uses a single layer core.

In some embodiments, the magnetic coupling between the fixed solenoids 202 with multi-layer highly permeable cores, and the time varying bias magnetic field generated by the vibrating magnetic core 208 results in a large magnetic flux reversal and maximized flux change in the solenoids 202, leading to a high maximum power of 610.62 mW, and a maximum power density of 20.84 mW/cm³ at a frequency of 42 Hz.

Figure 3A:
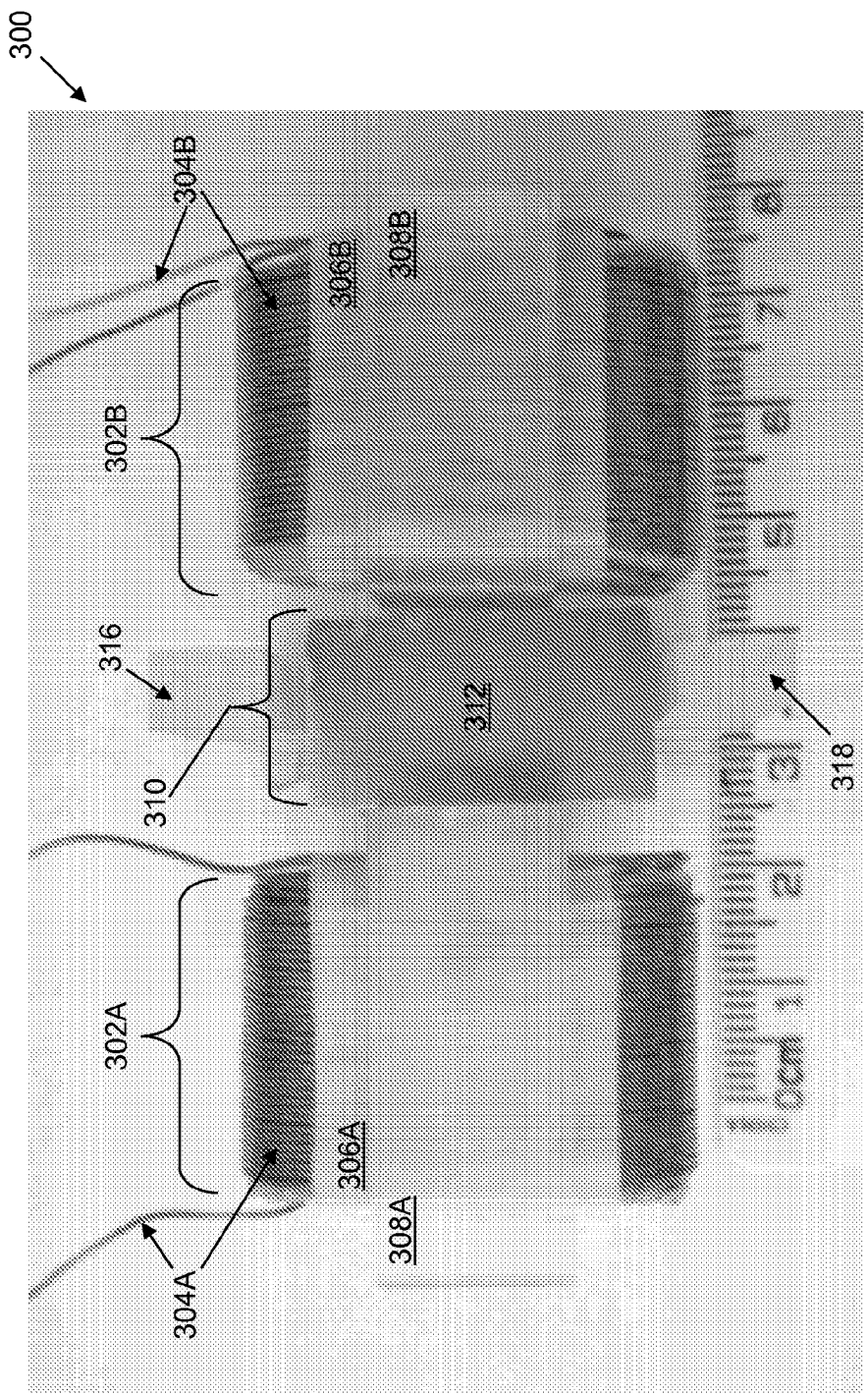
FIG. 3A is a top-view image of an energy harvesting device in accordance with certain embodiments.
Figure 3B:
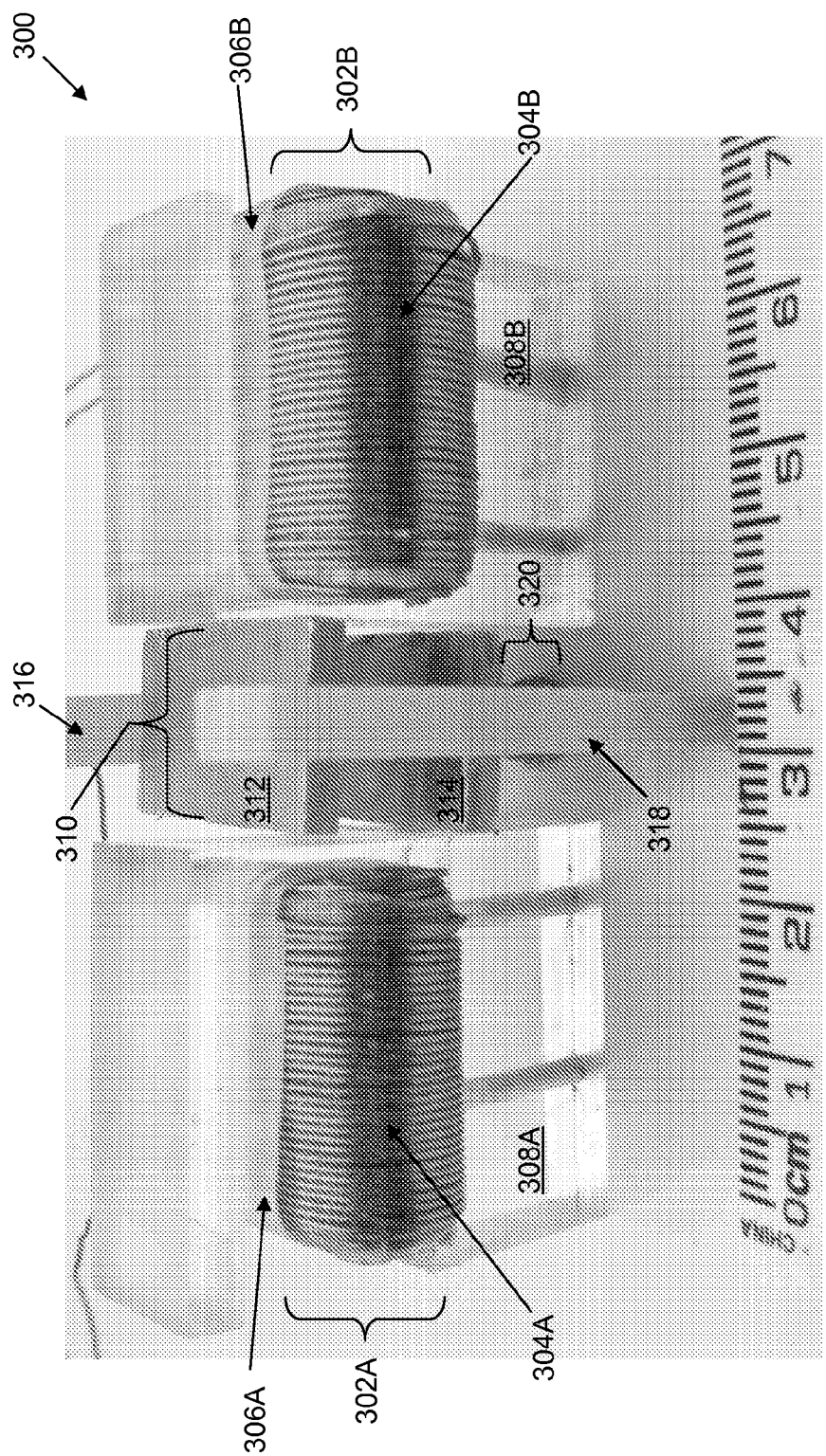
FIG. 3B is a side-view image of the energy harvesting device of FIG. 3A in accordance with certain embodiments.

FIG. 3A is a top-view image of an exemplary energy harvesting device 300, and FIG. 3B is a side-view image of the exemplary energy harvesting device 300 of FIG. 3A. The device 300 includes solenoids 302A, 302B, each with a copper wire coil 304A, 304B formed around the core, and wrapping 306A, 306B made of a thin insulator (e.g., teflon, paper, etc.) to hold the respective copper wire coil 304A, 304B in place about the core. In this example, each solenoid 302A, 302B core is a 28-layer high permeability MuShield® material, with dimensions 2 cm×2 cm×0.002 inch for each layer. In some embodiments, the copper wire coils 304A, 304B are made of copper wire (e.g., with a diameter of 1 mm or 40 mils). In some embodiments, the copper wires include 2-5 layers of copper coils, and each layer includes 20-50 turns around the core. The coil resistance of each solenoid 302A, 302B is 1.3 Ohm. Each solenoid 302A, 302B is held in place by a mount 308A, 308B made of a dielectric material (e.g., acrylic, or other insulator material). In some embodiments, the copper wires are coated with a thin insulator.

The magnetic core 310 includes two SmCo hard magnets 312, 314 with dimensions 2.2 cm×1.3 cm×0.2 cm. The two magnets 312, 314 are joined by a non-magnetic spacer to produce a fringing field that is coupled to the solenoids on the two ends of the hard magnets. The magnetic core 310 is mounted on spring 320, which has a circular cross-section. The magnetic core 310 can vibrate within the area formed by the mount 308A, 308B and supports 316, 318. In this example, the device 300 is powered by a vibrating stage that is driven by an audio power amplifier, and its mechanical movement is monitored by an accelerometer. The voltage output of the harvester 300 in the time domain is monitored by a digital oscilloscope. Total volume of the energy harvester is 6.44 cm×3.25 cm×1.4 cm=29.3 cm³, which includes the solenoids 302A, 302B, the magnetic core 310 and the gap between the solenoids 302A, 302B and the magnetic core 310.

Figure 4:
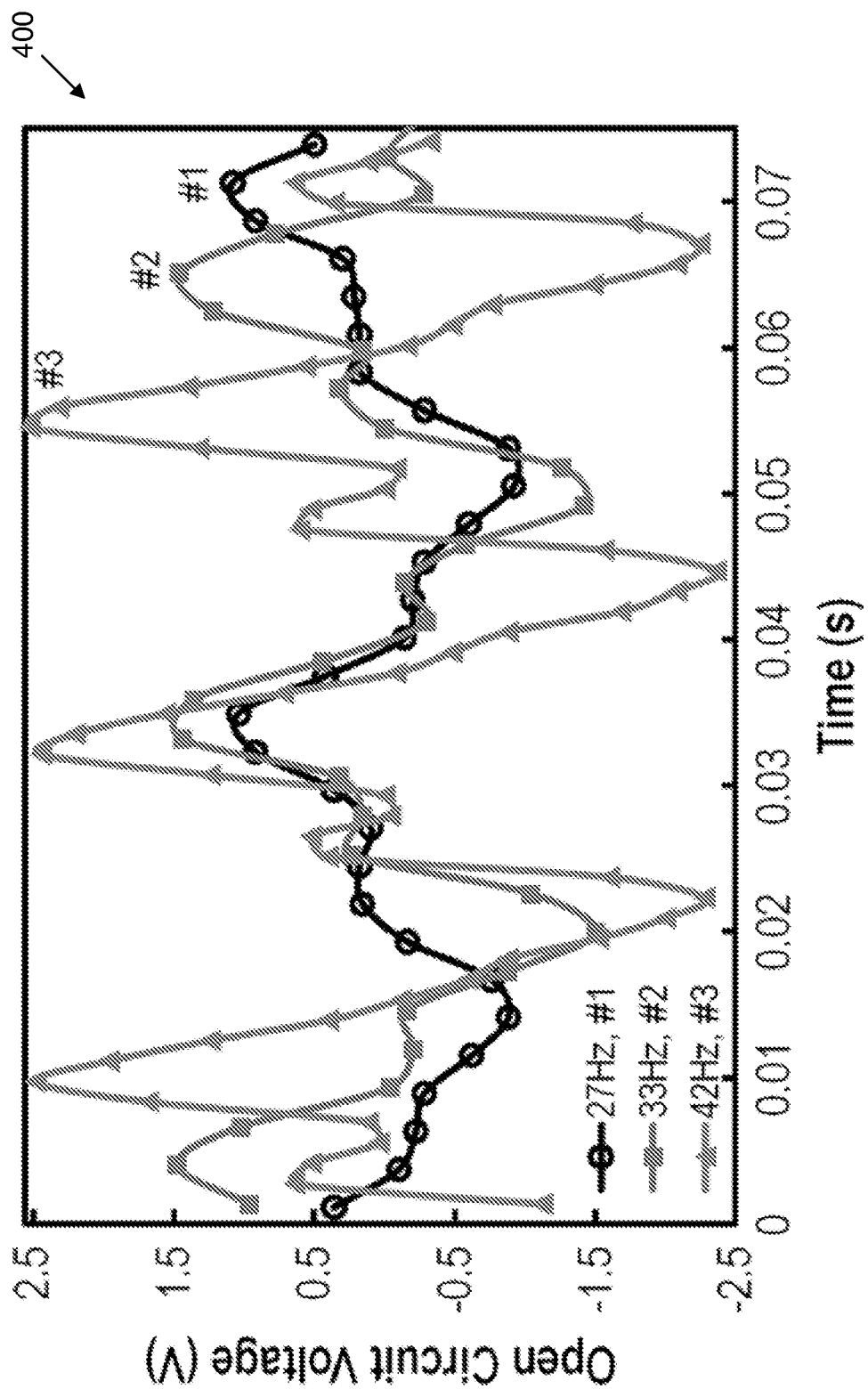
FIG. 4 is a graph of open circuit voltage (V) of the energy harvesting device of FIGS. 3A-3B over time (s) using three different springs in accordance with certain embodiments.

FIG. 4 is a graph 400 of measured open circuit voltage (V) of the energy harvesting device 300 of FIGS. 3A-3B over time (s) using three different springs in accordance with certain embodiments. Each spring has a different resonance frequency: spring #1 has a resonance frequency of 27 Hz, spring #2 has a resonance frequency of 33 Hz, and spring #3 has a resonance frequency of 42 Hz. For the first spring #1, the peak voltage is 1.18 V for an acceleration of 2 g (where g=9.8 m/s²), and the maximum output power on a 2.6 Ohm load is 133.88 mW. For the second spring #2, the peak voltage is 1.64 V for acceleration of 3 g, resulting in a maximum output power of 258.62 mW on a 2.6 Ohm load. For the third spring #3, the maximum induced voltage is 2.52 V for an acceleration of 5 g, with the corresponding power 610.62 mW on a 2.6 Ohm load. Increasing acceleration values were applied to maintain the same source vibration amplitude. Considering that the total practical volume of the device is 29.3 cm³, this device demonstrated excellent performance with the maximum power density of 20.84 mW/cm³ at 42 Hz. Graph 400 demonstrates that a higher resonance frequency leads to a larger output power.

The Q factor of the harvester at 42 Hz was 16, which was obtained from the decay curve of output voltage when turning off the source. Almost the entire device damping is generated from the mechanical collision between the spring supported magnetic core and the solenoid supports. Therefore, other crafting techniques that reduce this mechanical collision could achieve a much higher Q factor while using a much lower input force or acceleration (e.g., by designing the magnetic core such that it floats along a rail, to include bearings to reduce the friction against the surrounding supports, to include a material that reduces the friction between the magnetic core and the surrounding supports, etc.). A simple relation between frequency and power can be derived from Equation (3), as shown below in Equation (4), if all other parameters kept constant:

$$P_{max} \sim (\Delta M/\Delta T)^2 \sim f^2 \quad (4)$$

where:
$\Delta M$ is the flux change per period;
$\Delta T$ the period; and
f is the frequency.

Figure 5:
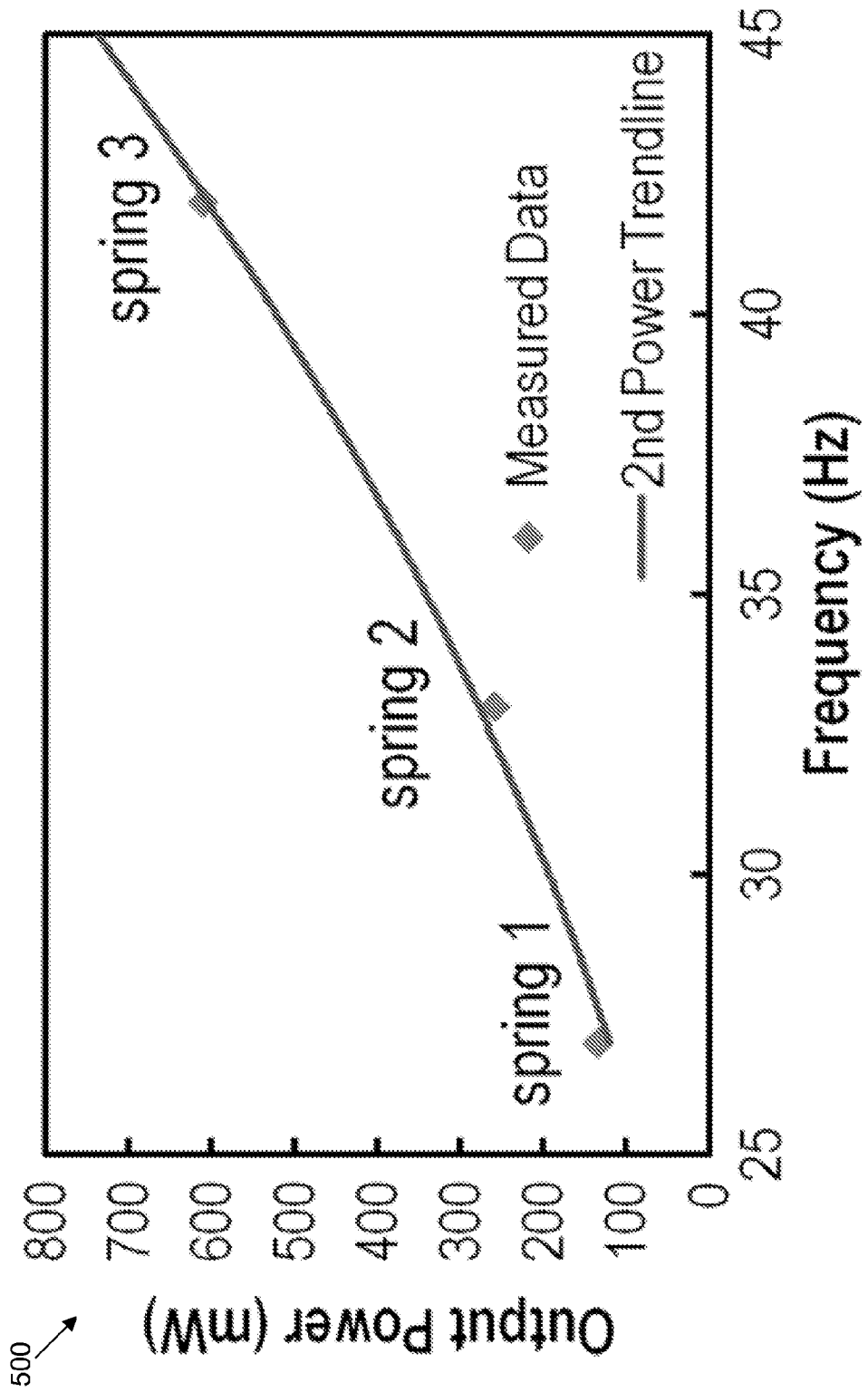
FIG. 5 is a graph of the output power (mW) of the energy harvesting device achieved using the three springs graphed in FIG. 4 in accordance with certain embodiments.

Measured test results confirm the parabolic curve fitting, as shown in FIG. 5, which is a graph 500 of the output power (mW) of the energy harvesting device achieved for the different frequencies (Hz) of the three springs graphed in FIG. 4. In some embodiments, the vibration energy harvester design can accommodate different vibrating frequencies of the environment by changing the spring that is connected to the magnetic core. For example, a larger vibration frequency of the environment (for a particular application) can induce a higher output power if matched with a spring with an appropriate resonance frequency. In some examples, if the vibration amplitude of the testing stage is kept the same, the output power and power density are proportional to the second power of the vibration frequency. If $P_{max} \sim f^2$ can be extrapolated to higher frequencies, a higher output power density can be achieved while maintaining a constant amplitude.

Figure 6:
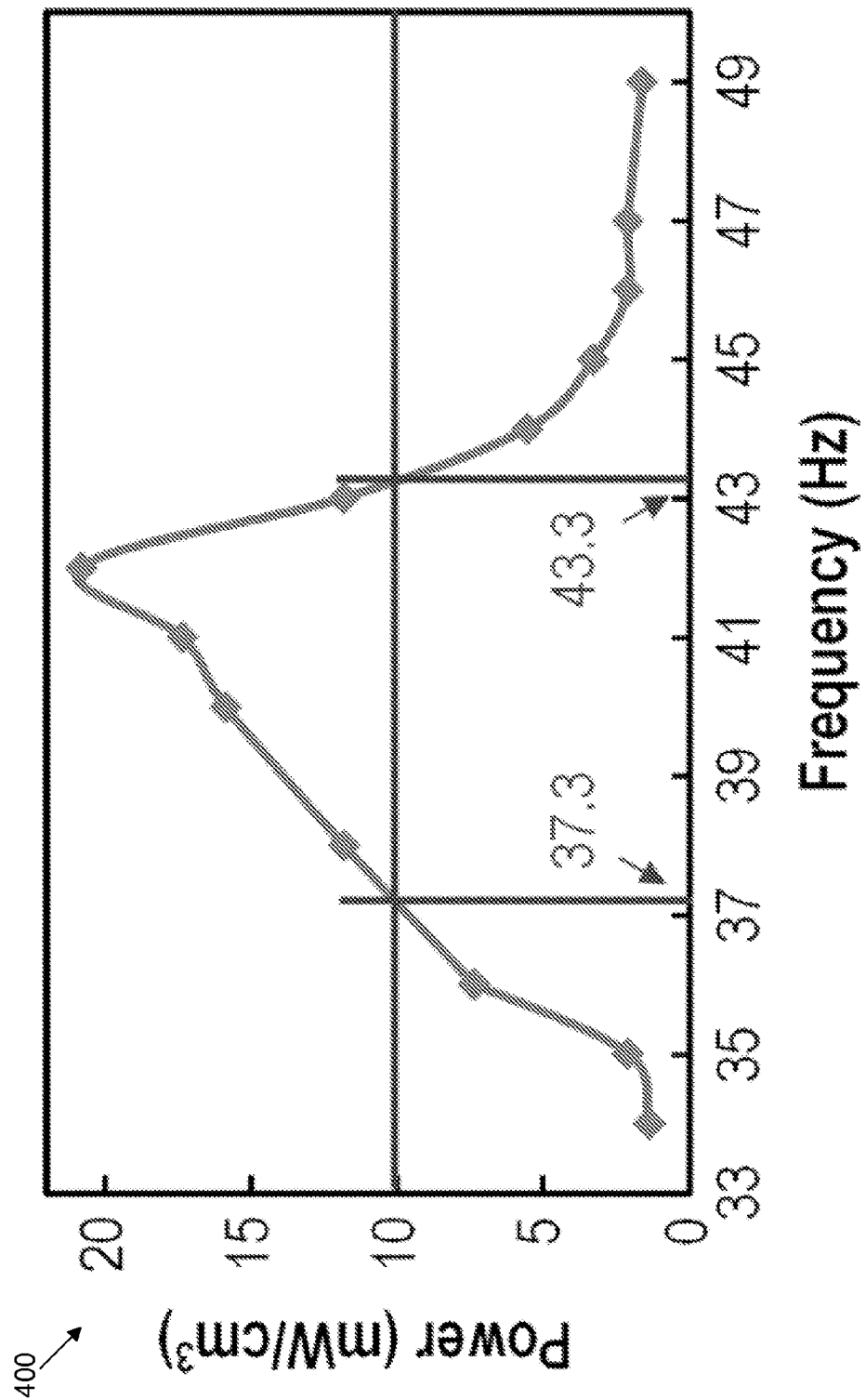
FIG. 6 is a graph of the power density (mW/cm$^3$) of the energy harvesting device based on the frequency (Hz) of the support in accordance with certain embodiments.

FIG. 6 is a graph 600 of the power density (mW/cm³) of the energy harvesting device based on the frequency (Hz). Graph 600 shows that the output power demonstrates a sagging rise before 42 Hz, which achieves a maximum output of 610.62 mW, and then rapidly declines afterwards. The asymmetrical curve can be caused by the nonlinear oscillation, which can increase the mechanical damping as the frequency ascends. The half-power bandwidth of the device with spring #3 was measured to be 6 Hz, or ~15% of the central frequency, which is much higher than the typical 2-5% bandwidth of typical piezoelectric cantilever-based energy harvesters.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. An energy harvesting device, comprising:
   a first and second solenoid, each solenoid comprising (a) a wire coil wrapped around (b) a high permeability core with two or more layers, and the first and second solenoid being disposed along a first path; and
   a magnetic core:
      disposed between the first and second solenoid such that the first solenoid is mounted on a first side of the magnetic core, and the second solenoid is mounted on a second side of the magnetic core; and
      mounted on a support such that the magnetic core can vibrate along a second path that intersects the first path, vibration of the magnetic core inducing a flux change in the first and second solenoids.

2. The energy harvesting device of claim 1, wherein the magnetic core comprises a first magnet.

3. The energy harvesting device of claim 2, wherein the magnetic core comprises a second magnet disposed above the first magnet such that the first magnet and second magnet have anti-parallel moments.

4. The energy harvesting device of claim 1, wherein the support comprises a spring.

5. The energy harvesting device of claim 4, wherein the spring comprises a circular cross-section.

6. The energy harvesting device of claim 4, wherein the spring has a resonance frequency of 42 Hz.

7. The energy harvesting device of claim 6, wherein vibration of the magnetic core achieves a power output density of 20.84 mW/cm³.

8. The energy harvesting device of claim 1, wherein each high permeability core is a 28-layer core, each layer comprising dimensions 2 cm×2 cm×0.002 inch.

9. The energy harvesting device of claim 8, wherein the magnetic core comprises a second magnet, and the first and second magnets are SmCo magnets with dimensions 2.2 cm×1.3 cm×0.2 cm.

10. The energy harvesting device of claim 9, wherein a total volume of the energy harvesting device is 6.44 cm×3.25 cm×1.4 cm=29.3 cm³.

11. The energy harvesting device of claim 1, wherein the first solenoid, the second solenoid, and the support are mounted to a base such that the first path is substantially parallel to the base, and the second path is substantially perpendicular to the base.

12. The energy harvesting device of claim 1, wherein the first and second solenoids comprise a same size.

13. The energy harvesting device of claim 12, wherein the first and second solenoids comprise a same shape.

14. The energy harvesting device of claim 12, further comprising joining the first and second solenoids in series to double a voltage of the energy harvesting device.

15. In an energy harvesting device, comprising (1) a first and second solenoid, each solenoid comprising (a) a wire coil wrapped around (b) a high permeability core with two or more layers, and the first and second solenoid being disposed along a first path, and (2) a magnetic core disposed between the first and second solenoid such that the first solenoid is mounted on a first side of the first magnet, and the second solenoid is mounted on a second side of the first magnet, the magnetic core being mounted on a support such that the magnetic core can vibrate along a second path that is orthogonal to the first path, a method comprising:

vibrating the magnetic core along the second path to induce a flux change in the first and second solenoids.

16. The method of claim 15, further comprising:
vibrating the magnetic core at 42 Hz; and
generating an output power of 610.62 mW.

* * * * *